(12) United States Patent
Joffre et al.

(10) Patent No.: US 7,345,768 B2
(45) Date of Patent: Mar. 18, 2008

(54) METHOD AND DEVICE FOR MEASURING THE PHASE AND AMPLITUDE OF ULTRASHORT LIGHT PULSES

(75) Inventors: Manuel Joffre, Palaiseau (FR); Thomas Oksenhendler, Paris (FR); Daniel Kaplan, Paris (FR); Pierre Tournois, Cagnes sur Mer (FR)

(73) Assignee: Fastlite, Saint Aubin (FR)

( * ) Notice: Subject to any disclaimer, the term of this patent is extended or adjusted under 35 U.S.C. 154(b) by 0 days.

(21) Appl. No.: 10/427,679

(22) Filed: May 1, 2003

(65) Prior Publication Data

US 2003/0210400 A1 Nov. 13, 2003

(30) Foreign Application Priority Data

May 7, 2002 (FR) ................................. 02 05872

(51) Int. Cl.
*G01B 9/02* (2006.01)
(52) U.S. Cl. ..................................... 356/450
(58) Field of Classification Search ............... 356/450, 356/454, 467, 478, 520, 521, 484; 359/239, 359/264, 328, 330; 372/9, 22, 30
See application file for complete search history.

(56) References Cited

U.S. PATENT DOCUMENTS

| | | | | |
|---|---|---|---|---|
| 3,756,689 A | * | 9/1973 | Hammond et al. | 359/314 |
| 3,800,303 A | * | 3/1974 | Picquendar et al. | 396/549 |
| 3,996,525 A | * | 12/1976 | Hughes et al. | 372/20 |
| 4,619,528 A | * | 10/1986 | Genack et al. | 356/301 |
| 4,720,177 A | * | 1/1988 | Chang | 359/305 |
| 5,363,192 A | * | 11/1994 | Diels et al. | 356/461 |
| 5,793,485 A | * | 8/1998 | Gourley | 356/318 |
| 5,946,128 A | * | 8/1999 | Paek | 359/305 |
| 6,108,081 A | * | 8/2000 | Holtom et al. | 356/301 |
| 6,191,861 B1 | * | 2/2001 | McBranch et al. | 356/432 |
| 6,424,451 B1 | * | 7/2002 | Chang | 359/308 |
| 6,549,547 B2 | * | 4/2003 | Galvanauskas et al. | 372/25 |
| 6,621,613 B2 | * | 9/2003 | Silberberg et al. | 359/239 |

OTHER PUBLICATIONS

Cormack et al. "Rapid measurment of ultrashort-pulse amplitude and phase from a two-photon absorption sonogram trace". J.OPT. SOC.JJI.E vol. 18. No. 9. I Sep. 29n1.pqs. 1377-1382.*
I. Cormack et al. "Rapid measurement of ultrashort-pulse amplitude and phase from a two-photon absorption sonogram trace", J.OPT. SOC.AM.E, vol. 18, No. 9, Sep. 1, 2001, pp. 1377-1382.
J. Chilla et al. "Direct determination of the amplitude and the phase of femtosecond light pulses", Optics Letters, vol. 16, No. 1, Jan. 1, 1999, pp. 39-41.

* cited by examiner

*Primary Examiner*—Hwa (Andrew) Lee
(74) *Attorney, Agent, or Firm*—Browdy and Neimark, PLLC

(57) ABSTRACT

A method for measuring ultrashort light pulse which comprises a first step of linear optical filtering of the signal for which it is desired to measure the amplitude of the pulses by means of an acoustic interaction between the optical signal and a colinear or quasi-colinear acoustic beam, a second step of either mixing in a non-linear response electro-optical element of optical beams diffracted by the acoustic beam, followed by one detector for detecting the light intensity derived from the mixer, or effecting one integration detection of the square of the optical intensity diffracted by the acoustic beam.

16 Claims, 1 Drawing Sheet

METHOD AND DEVICE FOR MEASURING THE PHASE AND AMPLITUDE OF ULTRASHORT LIGHT PULSES

BACKGROUND OF THE INVENTION

1. Field of the Invention

The present invention concerns a method and device for measuring the phase and amplitude of ultrashort light pulses.

2. Description of the Invention

Generally speaking, it is known that measuring the amplitude and phase of ultrashort light pulses, lasting between several femtoseconds and several picoseconds, presents a large number of difficulties.

The various currently possible measuring methods are described in the following documents:

- I. A. Walmsley and R. Trebino: "Measuring fast pulses with slow detectors", Optics and Photonics News, March 1996, vol 7, No 3, p. 23
- C. Dorrer and M. Joffre: "Characterisation of the spectral phase of ultrashort light pulses", C. R. Acad. Sc. Paris, t. 2, series IV, p. 1415-1426, 2001

These methods differ depending on whether there is a reference pulse available for measuring the phase and amplitude of the unknown short pulse.

In the case where there is no reference pulse available, so as to determine the characteristics of the optical pulse to be measured, it is necessary to use at least one non-linear response optical element. This is detailed in the document written by C. Dorrer and M. Joffre.

Amongst the methods of this latter type, these include the FROG (Frequency Resolved Optical Gating) method, the TROG (Time Resolved Optical Gating) method and the SPIDER (Spectral Phase Interferometry for Direct Electric field Reconstruction) method, these three methods being described in the following documents:

- R. Trebino and D. J Kane: "Using phase retrieval to measure the intensity and phase of ultrashort pulses: Frequency Resolved Optical Gating", J. Opt. Soc. Am., A11, p. 2429-2437, 1993 as regards the FROG method
- J. L. A. Chilla and O. E Martinez: "Direct determination of the amplitude and phase of femtosecond light pulses", Opt. Lett., 16, p. 39-41, 1991
- R. G. M. P Koumans and A. Yariv: "Time resolved Optical Gating based on dispersive propagation: a new method to characterised optical pulses", IEEE Journal of Quantum Electronics, 36, p. 137-144, 2000 as regards the TROG method
- C. Iaconis and I. A. Walmsley: "Spectral Phase Interferometry for Direct Electric field Reconstruction of ultrashort optical pulses", Opt. Lett., p. 792-794, 1998 as regards the SPIDER method.

It has been proved that these methods of the prior art make use of optical mountings associating a sub-unit carrying out a linear optical filtering function with said non-linear response optical element. These optical mountings are generally complex and require precise optical alignments.

OBJECT OF THE INVENTION

Therefore, the object of the invention is to eliminate these drawbacks. Thus, it aims to simplify measuring the amplitude and phase of ultrashort light pulses by using for the linear optical filtering function an acousto-optic interaction between two optical and colinear or quasi-colinear acoustic beams by mixing, in a non-linear response element, optical signals diffracted by the acoustic beam.

More specifically, this filtering function is based on a colinear or quasi-colinear acousto-optic interaction in a birefregent acousto-optic crystal intended to maximise the effective interaction length between an optical input wave $E_{in}(t)$ and a programmable acoustic wave which spatially reproduces the shape of the electric signal S(t) applied to a piezo-electric transducer associated with the crystal.

As this is explained in the patent FR No 96 10717 and the patent FR No 00 08 08278 filed in the name of the Applicant to the extent where the diffracted output waves of the crystal are of low intensity with regard to the intensity of the optical input wave, the programmable acousto-optic filter embodies a convolution between the amplitude of the input signal $E_{in}(t)$ and a signal $S(t/\alpha)$ derived from the electric signal S(t) applied to the piezo-electric transducer associated with the crystal, as described in the article by P. Tournois entitled "Acousto-optic programmable dispersive filter for adaptive compensation of group delay time dispersion in laser systems" which appeared in the review Optics Communications on Aug. 1, 1997, p. 245-249 and in the article by F. Verluise and al and entitled "Amplitude and phase control of ultrashort pulses by use of an acousto-optic programmable dispersive filter: pulse compression and shaping" which appeared in Optics Letters on Apr. 15, 2000, p. 575-577, namely:

$$E_{diffractée}(t) = E_{in}(t) S(t/\alpha)$$

$\alpha$ being defined in the previously mentioned article.

In this filtering device, the optical signal diffracted by the interaction with the acoustic beam has therefore undergone a linear filtering whose filtering function depends on the temporal shape of the acoustic signal. The propagation direction of the energy of the acoustic wave can be linear or quasi-linear with the direction of propagation of the energy of the optical input wave in their interaction zone.

SUMMARY OF THE INVENTION

With the aim of measuring the phase of ultrashort light pulses applied to the input of the filtering device, the invention proposes having at the outlet of this filtering device a non-linear response optical element intended to carry out the mixing of the optical signals diffracted by the acoustic beam.

In fact, the non-linear response optical element, which is necessary to associate with the filtering function, can be embodied for example with the aid of integrator quadratic detectors producing an electric signal from an incident optical signal, these detectors being of the "two photons" type described hereafter.

The "single photon" type integrator detector is a detector whose signal is proportional to the square of the amplitude of the optical electric field applied, that is to the optical intensity. For example, it can be produced by a photoelectric detector constituted by a semi-conductive diode, so that the energy of the forbidden band of the semiconductor is loss than the energy of the incident photons. For example, for photons of wavelength 0.8 μm, it could be possible to use a silicon-based detector. In this case, the integration constant of the detector is greater than the period of the optical signals.

The two photons integrator detector is a detector whose signal is proportional to the square of the optical intensity applied. If it is embodied from a semi-conductive diode, the energy of the forbidden band of the semiconductor shall be greater than the energy of the incident photons but less than double this energy. For example, for photons of wavelength of 0.8 μm, it could be possible to use a gallium phosphide-based detector (GaP). The integration constant of the detector is greater than the period of the optical signals.

According to a first variant of the invention, the optical signal to be measured interacts with at least two acoustic amplitude and frequency-modulated signals comprising with respect to each other adjustable time deviations.

According to a second variant of the invention, the optical signals signal to be measured interacts with at least three acoustic signals at least one of them having a pure or almost pure frequency and at least two others of the frequency and amplitude modulated signals and comprising with respect to the others adjustable time deviations.

BRIEF DESCRIPTION OF THE DRAWINGS

Embodiments for implementing the method of the invention are described hereafter and given by way of non-restrictive examples with reference to the accompanying drawings on which.

DESCRIPTION OF THE PREFERRED EMBODIMENTS

Figure 1:
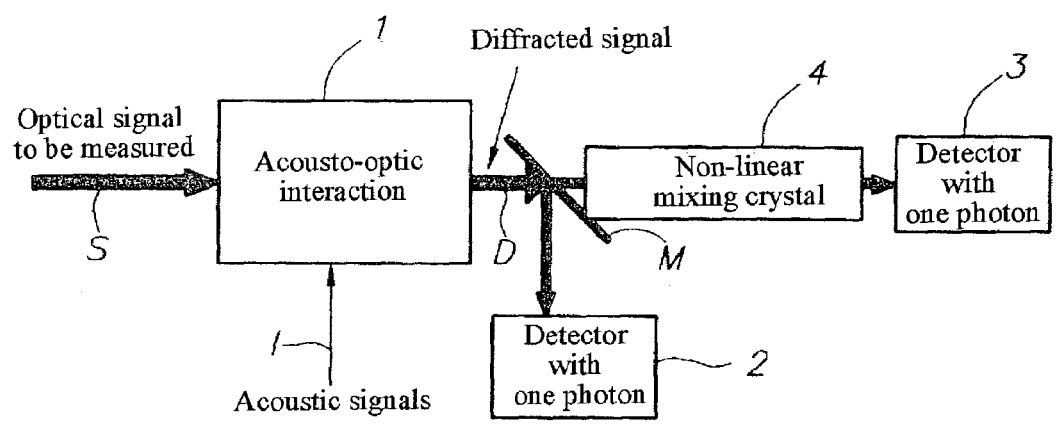
FIG. 1 is a diagrammatic representation of a device for measuring the phase and amplitude of ultrashort light pulses using two one photon detectors.

In the example shown on FIG. 1, the optical signal S to be measured is transmitted to an acousto-optic interaction block 1, for example of the type of those described in the patent FR No 96 10717 and the patent FR No 00 08278 filed in the name of the Applicant, which introduce at least one birefregrent acousto-optic crystal including one inlet face to which the optical signal (polarised) is applied, one outlet face from which the optical waves D diffracted inside the crystal leave, and at least one piezoelectric transducer to which an electric signal I originating from a signals generator controlled by a computer is applied.

In the acousto-optic interaction block 1, the direction of propagation of the energy of the acoustic wave can be colinear or quasi-colinear with the direction of propagation of the energy of the inlet optical wave in their interaction zone.

Amongst the various crystals able to be used (such as lithium niobate, calcium molybdate . . . ), tellurium dioxide results in obtaining a particularly large acousto-optic yield for a colinear or quasi-colinear interaction following the "Poynting" vectors of the acoustic and optic beams in the case of the slow transverse acoustic wave. This crystal shall therefore preferably be used.

The diffracted signal coming out of the acousto-optic interaction block 1 is applied to a semi-reflecting mirror M orientated at 45° which reflects a fraction of the diffracted signal in the direction of a first one photon detector 2 and which transmits another fraction of this signal to a second one photon detector 3 by means of a non-linear mixing crystal 4.

As explained hereafter, this configuration makes it possible to extract the spectral intensity and spectral phase of the optical signal to be measured, the one photon detector 2 being more particularly used to extract the spectral intensity and the one photon detector 3 for the spectral phase.

Figure 2:
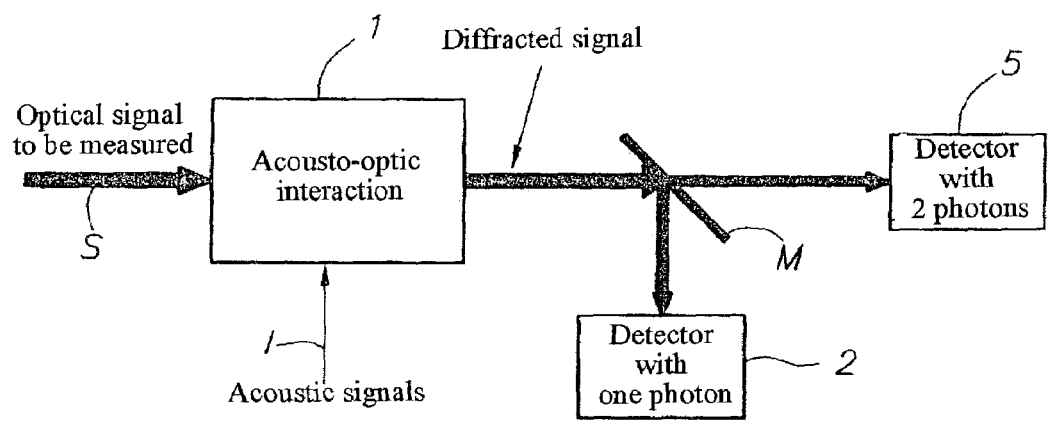
FIG. 2 is a diagrammatic representation of a measuring device of the type of FIG. 1 but using a one photon detector and two photons detector.

In the example of FIG. 2, which corresponds to a preferential implementation of the invention, the diffracted optical signal leaving the acousto-optic interaction block 1 is directly transmitted onto a two photons detector 5 which carries out in a single component mixing via non-linear interaction and quadratic detection which were carried out by two separate elements (non-linear mixer 4/one photon detector 3) in the example of FIG. 1. In this example, as shown in FIG. 1, one portion of the diffracted signal is extracted by means of a semi-reflecting mirror M and sent onto a one photon detector 2.

These configurations and more particularly that of FIG. 2 are simple and do not require any precise optical alignment, this being the case in measuring devices currently used in the prior art.

The invention shall be more readily understood by examining the general function of the acousto-optic interaction block 1 and a certain number of measuring methodology examples.

As previously mentioned, the core of the acousto-optic interaction block 1 is a birefregrent crystal, such as tellurium dioxide ($TeO_2$) bearing a transducer converting electric signals into acoustic signals. If it is assumed that the electric signal and accordingly its acoustic partner are constituted by given spectral components of amplitude $A(f)$ and phase $\Phi(f)$, for each of the frequencies f, the device diffracts a defined optical frequency $v(f)$. The diffracted amplitude $a(v)$ is proportional to the acoustic spectral amplitude $A(f)$ and the phase of the diffracted wave $\Phi(f)$ is a constant approaching the phase of the acoustic wave $\Phi(f)$. Thus, it is possible to programme the amplitude and optical phase by programming the amplitude and the acoustic phase, that is when there is available a general transversal linear filter. By superimposing several acoustic signals, it is possible to obtain several optical signals from the incident optical signal whose characteristics, like the relative optical delay, namely amplitude modulation, frequency modulation, etc., can be adjusted.

The invention can be applied advantageously in applications introducing this superimposition optical signals:

Thus, the interferometric self-correlation method described in the document by K. Naganuma, K. Mogi and H. Yamanda and entitled "General method for ultrashort light pulse measurement", IEEE Journal of Quantum Electronics, 25, p. 1225-1233, 1989 requires the superimposition of two optical signals separated by an adjustable time distance $\tau$ in which both the spectral intensity and the square of the spectral intensity as a function of $\tau$ are measured. By means of a complex algorithmic calculation, the phase and amplitude of the incident optical signal are extracted from this data. This result can be obtained more simply by means of the assembly on FIG. 2 in which the acousto-optic interaction block generates the two signals with a variable shift $\tau$, the one photon detector providing the spectral intensity and the two photons detector the square of the spectral intensity from which the spectral phase is extracted.

Similarly, the previously mentioned TROG method (document by J. L. A Chilla and O. E. Martinez) requires the superimposition of two optical signals, one being a replica of the signal to be measured and the other a quasi-pure frequency. By scanning the position of the first pulse in the time interval of the second (scanning at $\tau$) and by carrying out this scanning for several values of the pure frequency, time-frequency maps are obtained of the spectral intensity and the square of the spectral intensity. These scannings can be carried out by the acousto-optic interaction block of the type used by the method of the invention. An adequate calculation then makes it possible to go back to the characteristics of the pulse to be measured.

The TROG method described in the document by R. G. M. P Koumans and A. Yariv use the superimposition of two different optical signals, both frequency-modulated linearly and separated by an adjustable time distance τ. By means of a scanning of this time distance and a slope scanning of the frequency-linear modulation of one or both of the two signals, time-slope maps are obtained making it possible to revert to the characteristics of the optical pulse to be measured.

The SPIDER methods described in the documents by C. Iaconis and L. A. Walmsley entitled "Spectral Phase interferometry for Direct Electric-field Reconstruction of ultrashort optical pulses", Opt. Lett., 23, p. 792-794, 1998" and by C. Dorrer, P. Londero and I. A. Walmsley entitled "Homodyne detection in spectral interoferometry for direct electric-field reconstruction", Opt. Lett., 26, p. 1510-1512, 2001" require the superimposition of three signals, namely a pure frequency and two replicas of the signal to be measured time-shifted by an adjustable time distance τ. By means of a scanning of this time distance for various pure frequencies, time-frequencies maps are obtained making it possible to revert to the characteristics of the optical pulse to be measured.

Generally speaking, the invention is able to make use of all methodologies based on measurement of the square of the spectral intensity of any combination of pulses derived by the linear filtering of the pulse to be measured. In addition, the measurements of the spectral intensity are often carried out by spectrum analysers.

In the invention proposed, the spectrum analysers can be replaced by correlation functions effected by programmed time shifts τ followed by quadratic one photon detections (spectroscopy by Fourier transform). This results in an additional simplification of the assemblies and the elimination of an expensive component requiring delicate calibrations.

The invention claimed is:

1. Method for measuring the phase and amplitude of ultrashort pulses of a light signal, said method comprising:
   linear optical filtering of said light signal by exclusive means of an acoustic interaction between said light signal and a collinear or quasi-collinear acoustic beam,
   mixing in a non-linear response electro-optic element of optical beam diffracted by said collinear or quasi-collinear acoustic beam means of detection of above mixed beam.

2. Method according to claim 1, wherein said filtering is based on a collinear or quasi-collinear acousto-optic interaction in a birefringent acousto-optic crystal.

3. Method according to claim 1, wherein the measurement of the amplitude is obtained by the integration-detection of a fraction of the optical beams diffracted by the collinear or quasi-collinear acoustic beam by an one photon integrator-detector.

4. Method according to claim 1, wherein the measurement of the phase includes the detection-integration by a one photon integrator-detector of a fraction of the optical beams diffracted by the collinear or quasi-collinear acoustic beam and having traversed a non-linear mixing crystal.

5. Device for measuring the phase and amplitude of ultrashort pulses of a light signal said device comprising a component carrying out an acousto-optic interaction between said light signal and collinear or quasi-collinear acoustic and optical beams and at least one integrator-detector for detecting the square of the light intensity diffracted by the acoustic beam.

6. Device according to claim 5 which further comprises at least one supplemental integrator-detector for detecting the light intensity diffracted by the collinear or quasi-collinear acoustic beam.

7. Device according to claim 5, wherein said light signal to be measured interacts with at least two amplitude and frequency-modulated acoustic signals and comprising with respect to one another adjustable time differences.

8. Device according to claim 5, wherein the light signal to be measured interacts with at least a first acoustic signal having a pure or almost pure frequency and second and third amplitude and frequency-modulated acoustic signals which comprises adjustable time differences.

9. Device for measuring the phase and amplitude of ultrashort light pulses of a light signal, said device comprising a component carrying out an acousto-optic interaction between the light signal and collinear or quasi-collinear acoustic beams, at least one non-linear optical crystal for mixing the optical signals of the light signal beam diffracted by the collinear or quasi-collinear acoustic beam and at least one integrator detector for detecting the light intensity derived from said mixing crystal.

10. Device according to claim 9, wherein it further includes a supplemental integrator detector for detecting the light intensity diffracted by the collinear or quasi-collinear acoustic beam.

11. Device according to claim 9, wherein the light signal to be measured interacts with at least two amplitude and frequency-modulated acoustic signals and comprising with respect to one another adjustable time differences.

12. Device according to claim 9, wherein the light signal to be measured interacts with a first acoustic signal, having a pure or almost pure frequency and second and third amplitude and frequency-modulated acoustic signals which comprises adjustable time differences.

13. Method for measuring the phase and amplitude of ultrashort pulses of a light signal, said method comprising:
   linear optical filtering of said light signal by means of an acoustic interaction between said light signal and a collinear or quasi-collinear acoustic beam,
   effecting at least one detection-integration of the square of the light intensity diffracted by the collinear or quasi-collinear acoustic beam.

14. Method according to claim 13, wherein said linear optical filtering is based on a collinear or quasi-collinear acousto-optic interaction in a birefringent acousto-optic crystal.

15. Method according to claim 13, wherein the measurement of the amplitude is obtained by the integration-detection of a fraction of the optical beams diffracted by the collinear or quasi-collinear acoustic beam by an one photon integrator-detector.

16. Method according to claim 13, wherein the measurement of the phase includes the integration-detection by a two photons integrator-detector.

* * * * *